United States Patent
Barak et al.

(10) Patent No.: US 9,704,023 B2
(45) Date of Patent: Jul. 11, 2017

(54) SYSTEMS AND METHODS FOR PROVIDING OBJECT RECOGNITION BASED ON DETECTING AND EXTRACTING MEDIA PORTIONS

(71) Applicant: Facebook, Inc., Menlo Park, CA (US)

(72) Inventors: Dan Barak, Redwood City, CA (US); Tomer Bar, San Francisco, CA (US); Kun Chen, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/656,276

(22) Filed: Mar. 12, 2015

(65) Prior Publication Data
US 2016/0267674 A1    Sep. 15, 2016

(51) Int. Cl.
*G06K 9/00* (2006.01)
(52) U.S. Cl.
CPC ..... *G06K 9/00288* (2013.01); *G06K 9/00677* (2013.01)

(58) Field of Classification Search
USPC ................................................. 382/115–118
See application file for complete search history.

(56) References Cited

U.S. PATENT DOCUMENTS

| | | | |
|---|---|---|---|
| 2007/0239778 A1* | 10/2007 | Gallagher | G06F 17/30244 |
| 2008/0298643 A1* | 12/2008 | Lawther | G06F 17/30256 382/118 |
| 2012/0201472 A1* | 8/2012 | Blanchflower | G06K 9/00671 382/224 |

\* cited by examiner

*Primary Examiner* — Alex Liew
(74) *Attorney, Agent, or Firm* — Sheppard Mullin Richter & Hampton LLP

(57) ABSTRACT

Systems, methods, and non-transitory computer-readable media can receive a selection of an image. An object included in the image can be detected. An image portion that includes the object can be extracted from the image. The image portion can be provided for image analysis based on one or more object recognition processes. An identifier for the object can be received. The identifier can be determined based on the one or more object recognition processes being applied to the image portion.

19 Claims, 9 Drawing Sheets

SYSTEMS AND METHODS FOR PROVIDING OBJECT RECOGNITION BASED ON DETECTING AND EXTRACTING MEDIA PORTIONS

FIELD OF THE INVENTION

The present technology relates to the field of media processing. More particularly, the present technology relates to techniques for providing object recognition based on detecting and extracting media portions.

BACKGROUND

Today, people often utilize computing devices (or systems) for a wide variety of purposes. Users can use their computing devices to, for example, interact with one another, create content, share information, and access information. In some instances, a user of a computing device can utilize a camera or other image sensor of the computing device (or system) to capture or record media content, such as images and/or videos.

In some cases, media content such as images can be processed, such as when the images are uploaded to a social networking system. Image processing applied to images can, for example, be utilized to acquire information about the images. Under conventional approaches, image processing can often require significant amounts of computer processing power, time, data consumption, as well as manual effort. As such, conventional approaches can be inefficient, expensive, and inconvenient. Due to these and other reasons, conventional approaches can create challenges for or reduce the overall user experience associated with utilizing computing devices (or systems) to interact and engage with media content, such as images.

SUMMARY

Various embodiments of the present disclosure can include systems, methods, and non-transitory computer readable media configured to receive a selection of an image. An object included in the image can be detected. An image portion that includes the object can be extracted from the image. The image portion can be provided for image analysis based on one or more object recognition processes. An identifier for the object can be received. The identifier can be determined based on the one or more object recognition processes being applied to the image portion.

In an embodiment, the image and the identifier can be presented. One or more options to modify at least one of the identifier or information associated with the image can be provided. An upload command to upload the image can be received. The image and the identifier can be transmitted subsequent to receiving the upload command.

In an embodiment, detecting the object included in the image can further comprise determining a location of the object within the image. The identifier can be presented based on the location of the object within the image. The identifier can be presented to appear to overlay the image. The identifier can be presented to avoid obscuring the object included in the image.

In an embodiment, a second object included in the image can be detected. A second image portion that includes the second object can be extracted from the image. The second image portion can be provided for image analysis based on the one or more object recognition processes. The image portion and the second image portion can be provided in conjunction.

In an embodiment, the one or more object recognition processes can be performed, at least in part, via one or more remote servers.

In an embodiment, the object can include a face of a user represented in the image. The one or more object recognition processes can include one or more facial recognition processes. The identifier can include a name associated with the user.

In an embodiment, the one or more facial recognition processes can utilize, at least in part, one or more people clustering processes.

In an embodiment, the selection of the image can be received from an uploading user. The uploading user can be associated with a set of social connections via a social networking system. The one or more facial recognition processes can utilize, at least in part, one or more face models associated with a subset of social connections out of the set of social connections.

In an embodiment, the subset of social connections can include a specified quantity of highest ranked social connections. Each social connection in the set can be ranked based on at least one of a social coefficient metric for each social connection relative to the uploading user, a social affinity metric for each social connection relative to the uploading user, a social interaction recency metric for each social connection relative to the uploading user, or location data associated with each social connection.

In an embodiment, the identifier can be utilized, at least in part, to define a set of images such that each image in the set includes a respective object associated with the identifier.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
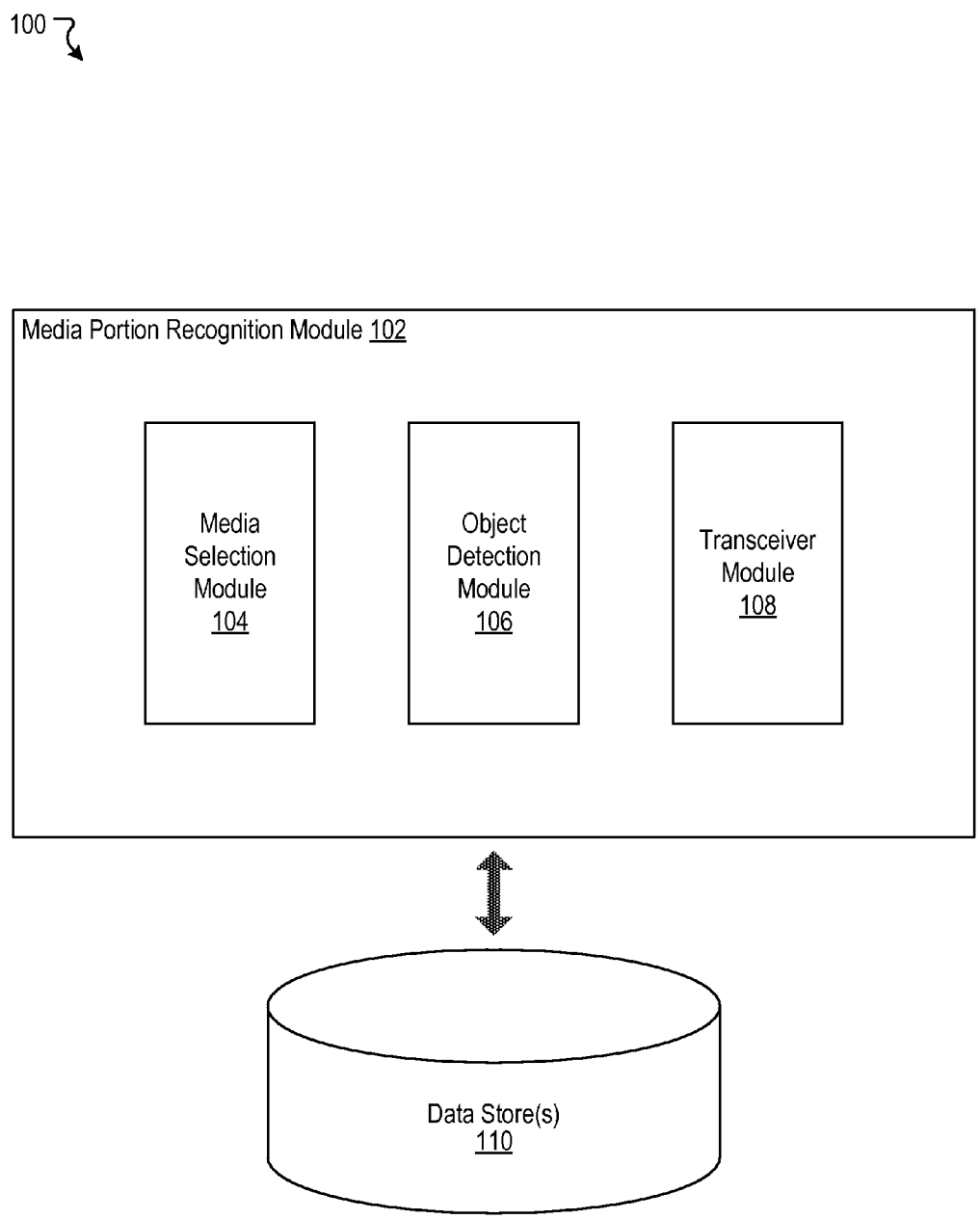
FIG. 1 illustrates an example system including an example media portion recognition module configured to facilitate providing object recognition based on detecting and extracting media portions, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Object Recognition Based on Detecting and Extracting Media Portions

People use computing devices (or systems) for a wide variety of purposes. Computing devices can provide different kinds of functionality. Users can utilize their computing devices to produce information, access information, and share information. In some instances, computing devices can include or correspond to cameras capable of capturing or recording media content, such as images or videos. In some cases, computing devices can view, access, download, and save such media content.

In one example, a user of a social networking system can utilize his or her computing device to upload a media content item, such as an image, to the social networking system. The image can include, depict, or represent one or more persons. For instance, the image can include a visual representation of a person, such as when the image depicts the person's face. Conventional approaches to media processing can sometimes require manual effort in order to recognize objects (e.g., the person's face) included, depicted, or represented in the image. Such conventional approaches can, for instance, require a manual tap or click with respect to the person's face object in the image and then a manual selection or input indicating to whom the face belongs. Further, in some cases, conventional approaches can utilize facial recognition processes or techniques to analyze the entire image to identify the person whose face is included in the image. However, such conventional approaches can require significant processing power, time, and/or data consumption.

As such, conventional approaches can be inconvenient, inefficient, and/or expensive. Therefore, an improved approach can be beneficial for addressing or alleviating various concerns associated with conventional approaches. The disclosed technology can provide object recognition based on detecting and extracting media portions. Various embodiments of the present disclosure can receive a selection of an image. An object included in the image can be detected. An image portion that includes the object can be extracted from the image. The image portion can be provided for image analysis based on one or more object recognition processes. An identifier for the object can be received. The identifier can be determined based on the one or more object recognition processes being applied to the image portion. It is contemplated that there can be many variations and/or other possibilities.

FIG. 1 illustrates an example system 100 including an example media portion recognition module 102 configured to facilitate providing object recognition based on detecting and extracting media portions, according to an embodiment of the present disclosure. As shown in the example of FIG. 1, the media portion recognition module 102 can include a media selection module 104, an object detection module 106, and a transceiver module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the media portion recognition module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the media portion recognition module 102 can be implemented, in part or in whole, as software running on one or more computing devices or systems, such as on a user or client computing device. For example, the media portion recognition module 102 or at least a portion thereof can be implemented as or within an application (e.g., app), a program, or an applet, etc., running on a user computing device or a client computing system, such as the user device 710 of FIG. 7. In another example, the media portion recognition module 102 or at least a portion thereof can be implemented using one or more computing devices or systems that include one or more servers, such as network servers or cloud servers. In some instances, the media portion recognition module 102 can, in part or in whole, be implemented within or configured to operate in conjunction with a social networking system (or service), such as the social networking system 730 of FIG. 7. It should be understood that there can be many variations or other possibilities.

The media selection module 104 can be configured to facilitate receiving a selection of a media content item, such as an image (e.g., photo, picture, video still frame, animated image, etc.) or a video (e.g., a plurality of video still frames with or without audio). In some cases, a user of a computing device (or system) and/or a social networking system (or service) can provide the selection of the media content item, such as the image (or video, etc.), which can be received by the media selection module 104. In one example, the user can select the image for uploading, downloading, sharing, posting, publishing, transmitting, and/or other purposes. In some instances, the image selection received by the media selection module 104 can be provided by an image selection process, such as a random image selection algorithm or a recently acquired image selection algorithm. It should be understood that many variations are possible.

The object detection module 106 can be configured to facilitate detecting an object included in the image. The object detection module 106 can also be configured to facilitate extracting, from the image, an image portion (or patch, area, etc.) that includes the object. More details regarding the facial recognition module 106 will be provided below with reference to FIG. 2A.

The transceiver module 108 can be configured to facilitate providing the image portion for image analysis based on (i.e., based at least in part on) one or more object recognition processes. The transceiver module 108 can further be configured to facilitate receiving an identifier for the object. The identifier can be determined based on the one or more object recognition processes being applied to the image portion. The transceiver module 108 will be discussed in more detail with reference to FIG. 2B.

Furthermore, in some implementations, the media portion recognition module 102 can be configured to communicate and/or operate with the at least one data store 110, as shown in the example system 100. The at least one data store 110 can be configured to store and maintain various types of data. In some implementations, the at least one data store 110 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user locations, user specified settings, content produced or posted by users, and various other types of user data. In some embodiments, the at least one data store 110 can store information that is utilized by the media portion recognition module 102. For instance, the at least one data store 110 can store information about images as well as information useful for object detection and object recognition. It is contemplated that there can be many variations or other possibilities.

In one example, the user of the social networking system can utilize his or her computing system to post, share, and/or send media content via the social networking system. In this example, the user can select an image to be uploaded for posting, sharing, and/or sending via the social networking system. The user's selection of the image can be received by the media selection module 104. The object detection module 106 can then apply one or more face object detection processes (i.e., face detection processes, facial detection processes, etc.) to the image in order to detect any face objects included, represented, and/or depicted in the image.

Continuing with the example, the image can include, represent, and/or depict a face of a social connection or friend of the user within the social networking system. The object detection module 106 can detect, based on the face object detection processes, the face object of the social connection or friend included in the image. Additionally, the object detection module 106 can also extract, from the image, a corresponding image portion that includes the face object. The transceiver module 108 can provide the image portion for image analysis based on one or more object recognition processes, such as one or more face object recognition processes (i.e., face recognition processes, facial recognition processes, etc.). The transceiver module 108 can subsequently receive an identifier determined for the object based on the one or more object recognition processes being applied to the image portion. In this example, the identifier can correspond to a name (e.g., username, account name, etc.) of the user's social connection or friend whose face is included in the image. Furthermore, in this example, the identifier can be in the form of a tag including the name of user's social connection or friend. The identifier (e.g., tag) can be automatically provided in association with the image. If the user so chooses, when he or she initiates the uploading of the image for posting, sharing, and/or sending, the identifier can be included in the image uploading process.

In another example, a second object included in the image, such as a face object associated with another social connection or friend of the user, can be detected by the object detection module 106. A second image portion that includes the second object can be extracted from the image by the object detection module 106. The second image portion can be provided, by the transceiver module 108, for image analysis based on the one or more object recognition processes. In some cases, the image portion and the second image portion can be provided, in conjunction, for image analysis. Moreover, in this example, a second identifier in the form of a second tag including the name of user's other social connection or friend can be received. When the users initiates the uploading of the image for posting, sharing, and/or sending, the second identifier can be included as well. It should be appreciated that the examples herein are provided for illustrative purposes and that many variations are possible.

Figure 2A:
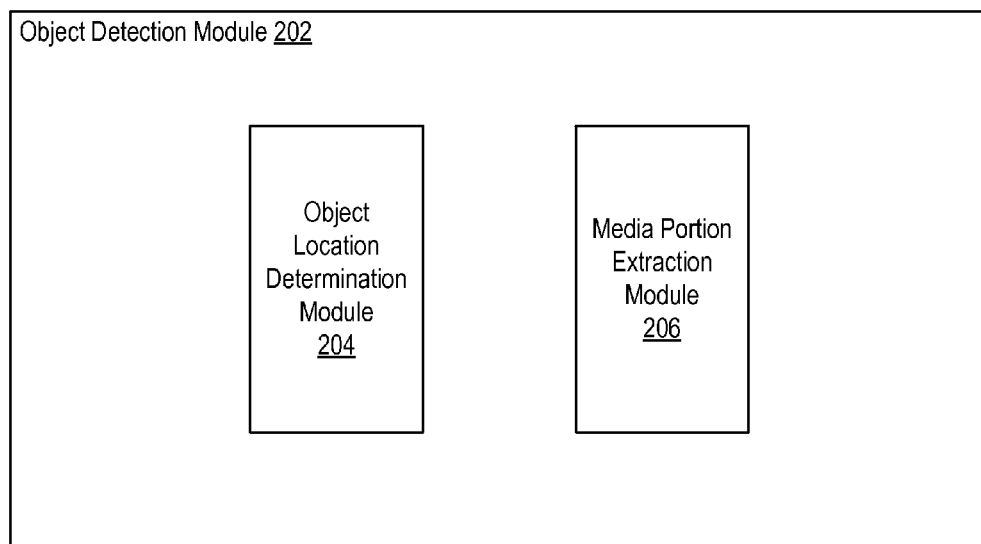
FIG. 2A illustrates an example object detection module configured to facilitate detecting and extracting media portions, according to an embodiment of the present disclosure.

FIG. 2A illustrates an example object detection module 202 configured to facilitate detecting and extracting media portions, according to an embodiment of the present disclosure. In some embodiments, the object detection module 106 of FIG. 1 can be implemented as the example object detection module 202. As shown in FIG. 2A, the object detection module 202 can include an object location determination module 204 and a media portion extraction module 206.

As discussed previously, the object detection module 202 can be configured to facilitate detecting an object included in an image. In some cases, the object detection module 202 can utilize one or more object detection processes to detect any objects in the image. For instance, the object detection module 202 can utilize one or more face object detection processes to detect the presence of any face objects or faces included (i.e., represented, depicted, shown, displayed, etc.) in the image. In some cases, object detection processes applied to an entire image can be more efficient and/or can require less resources (e.g., processing power, time, data consumption, etc.) than object recognition processes applied to the same entire image. This can be because object detection processes are generally configured to detect whether or not any defined (or predefined) objects are present in the image, while object recognition processes are generally configured to recognize or identify any defined (or predefined) objects in the image.

In some embodiments, detecting the object included in the image can further comprise determining a location of the object within the image. The object location determination module 204 can be configured to determine the location of the object within the image. In some cases, the object location determination module 204 can determine or identify a set of pixels of the image that includes the object. The set of pixels can, for example, form or correspond to a particular image portion, image patch, or image area, etc. In one example, the object location determination module 204 can determine where in the image any faces of people are located. The object location determination module 204 can determine one or more sets of pixels or one or more image portions that include one or more detected faces.

Furthermore, the object detection module 202 can utilize the media portion extraction module 206 to facilitate extracting, from the image, an image portion that includes a detected object. The media portion extraction module 206 can, for instance, extract a copy of the image portion or set of pixels that includes the detected object. In one example, the media portion extraction module 206 can extract a respective image portion (or a respective copy thereof) that includes each face detected in the image. It should be appreciated that there can be many variations or other possibilities.

Figure 2B:
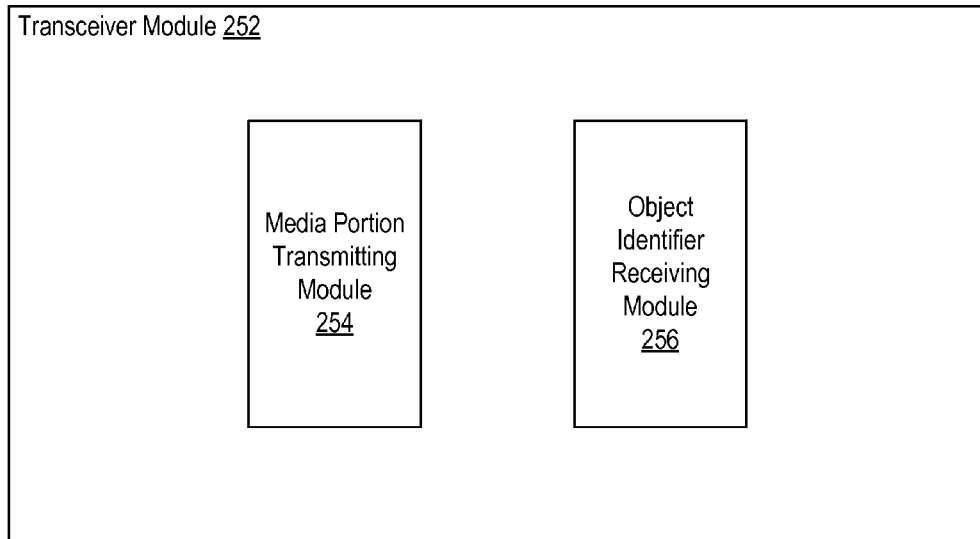
FIG. 2B illustrates an example transceiver module configured to facilitate providing object recognition based on detecting and extracting media portions, according to an embodiment of the present disclosure.

FIG. 2B illustrates an example transceiver module 252 configured to facilitate providing object recognition based on detecting and extracting media portions, according to an embodiment of the present disclosure. In some embodiments, the transceiver module 108 of FIG. 1 can be implemented as the example transceiver module 252. As shown in FIG. 2B, the transceiver module 252 can include a media portion transmitting module 254 and an object identifier receiving module 256.

In some embodiments, the transceiver module 108 can utilize the media portion transmitting module 254 to transmit, send, or provide an image portion of a detected object for image analysis based on one or more object recognition processes. As discussed previously, in some cases, object recognition processes can require more resources and/or are more computationally intensive than object detection processes. As such, the disclosed technology can use the object detection processes to detect objects and then extract image portions of any detected objects. The extracted image portions can then be provided, such as by the media portion transmitting module 254, to be analyzed based on the object recognition processes. Therefore, instead of applying the object recognition processes to one or more entire images, the object recognition processes can be applied to only one or more image portions. This can save resources and allow the object recognition processes to be performed more efficiently.

In some implementations, the one or more object recognition processes can be performed, at least in part, via one or more remote servers. In one example, one or more face object recognition processes can be performed via one or more servers of a social networking system or service (e.g., the social networking system 730 of FIG. 7). It is contemplated that many variations are possible. For instance, in some cases, the object recognition processes can be performed by the same computing device(s) or system(s) that performs the object detection processes. In some embodiments, one or more identifiers for objects (e.g., identifiers for face objects) can be provided from the one or more remote servers to the computing device (or system) that transmitted or provided the image to the remote servers. The one or more remote servers can provide options or suggestions to the computing device regarding who or what is depicted in the image. In some cases, if the object recognition processes determines equal or substantially similar (i.e., similar within an allowable deviation) recognition confidence scores for multiple possible recognitions, then the computing device can be presented with (e.g., from the remote servers) at least one optional or suggested identifier for each of the multiple possible recognitions. For example, if one or more face recognition processes, applied to a given face, determines equal or substantially similar recognition confidence scores for Person X, Person Y, and Person Z, then the computing device can be presented with an optional or suggested identifier (e.g., tag, name) for each of Person X, Person Y, and Person Z.

Furthermore, in some embodiments, the transceiver module 108 can utilize the object identifier receiving module 256 to receive an identifier for the object. The identifier can, for example, be determined based on the one or more object recognition processes being applied to the provided image portion. In some cases, the identifier can correspond to a tag or a marker that indicates a name or a label associated with the object, which has been recognized based on the one or more object recognition processes. Again, there can be many variations or other possibilities.

Figure 3:
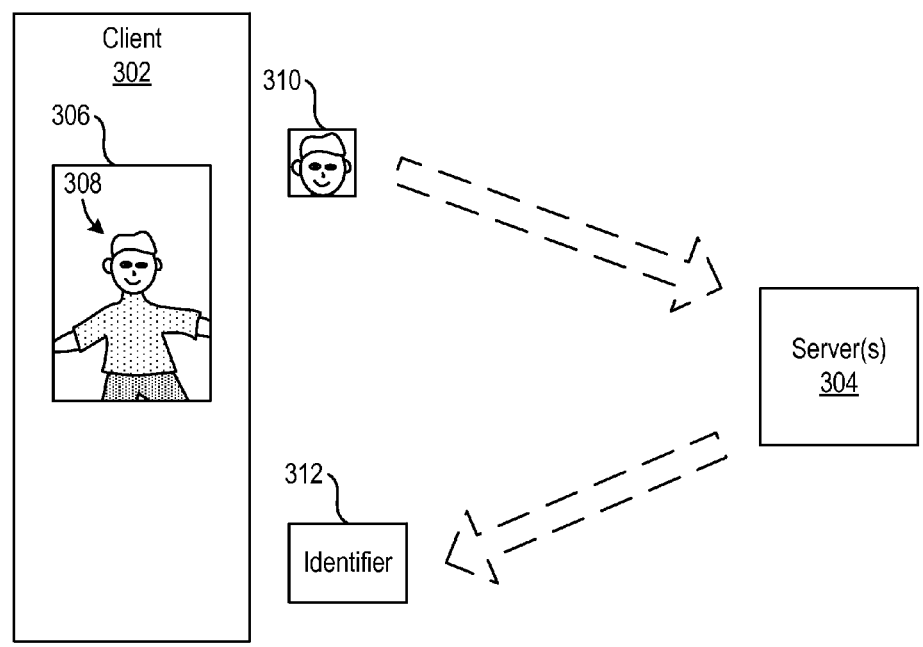
FIG. 3 illustrates an example scenario associated with providing object recognition based on detecting and extracting media portions, according to an embodiment of the present disclosure.

FIG. 3 illustrates an example scenario 300 associated with providing object recognition based on detecting and extracting media portions, according to an embodiment of the present disclosure. The example scenario 300 illustrates a client 302, such as a client computing device or system, and a server(s) 304.

As shown in the example of FIG. 3, an image 306 can be selected at the client 302. The image 306 can include (i.e., represent, depict, show, display, etc.) a face 308 of a user. In this example, one or more face object detection processes can be performed at the client 302 to detect the user's face or face object 308. Having detected the face object 308, an image portion 310 including the face object 308 can be extracted from the image 306. The client 302 can then provide or transmit the image portion 310 to the server(s) 304. The server(s) 304 can perform one or more face object recognition processes with respect to the image portion 310 to recognize the face object 308 and determine an identifier 312 for the face object 308. The server(s) 304 can then transmit the identifier 312 to be received at the client 302. Many variations are possible.

Figure 4:
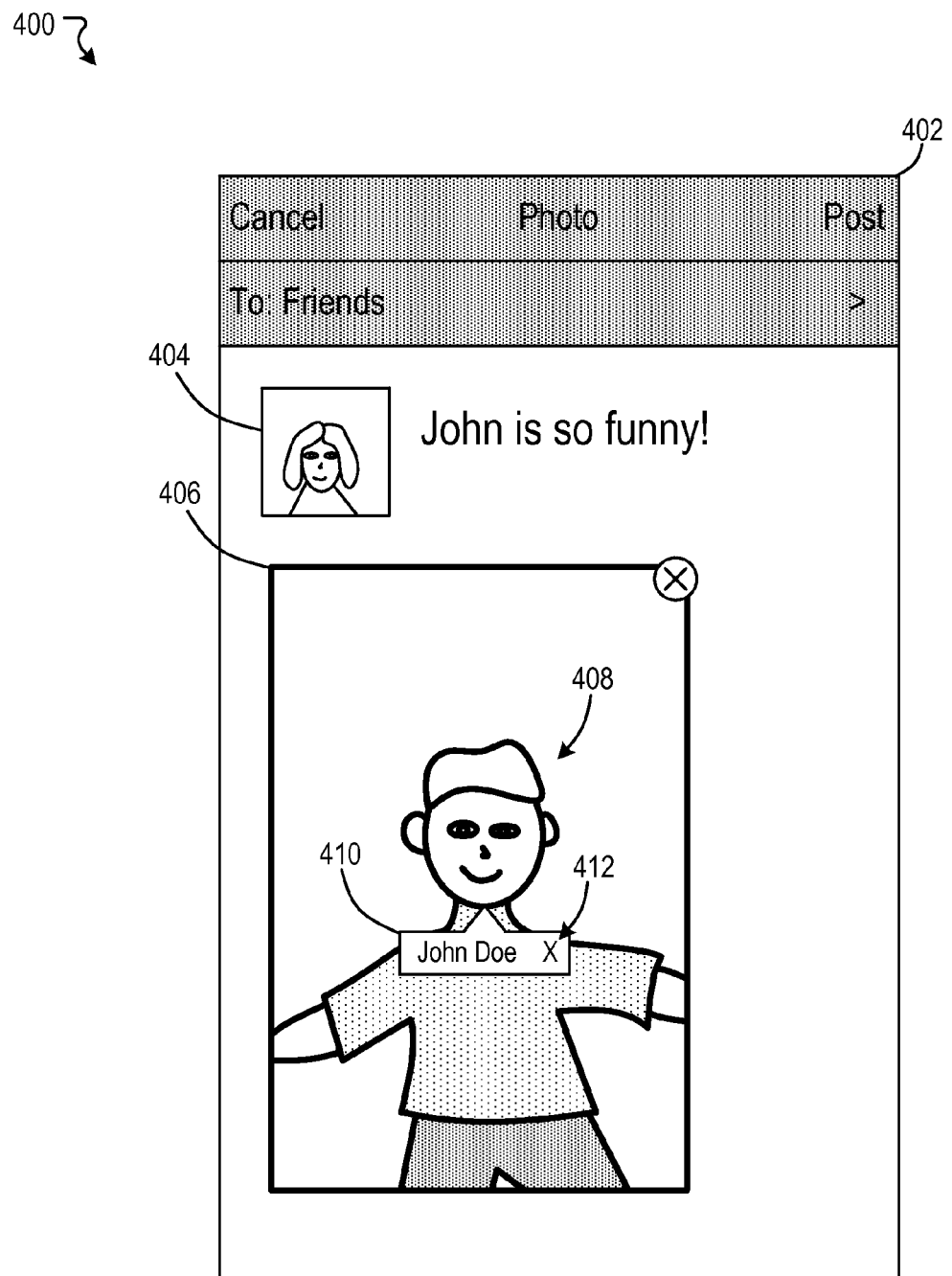
FIG. 4 illustrates an example scenario associated with providing object recognition based on detecting and extracting media portions, according to an embodiment of the present disclosure.

FIG. 4 illustrates an example scenario 400 associated with providing object recognition based on detecting and extracting media portions, according to an embodiment of the present disclosure. The example screenshot 400 illustrates an example interface 402, such as a user interface of an application utilizing or otherwise associated with the disclosed technology.

As shown in FIG. 4, the example interface 402 can enable a first user 404 to select an image 406 to be uploaded, posted, shared, sent, and/or otherwise processed at a social networking system. The image 406 can include a second user, such as a friend or social connection of the first user 404. In particular, the image 406 can include the second user's face 408.

In this example scenario 400, subsequent to a selection of the image 406 by the first user 404, the second user's face or face object 408 can be detected during face detection. An image portion including the second user's face object 408 can be provided for image analysis based on face recognition. In this example, an identifier 410 can be determined based on the face recognition. The identifier 410 can indicate a name of the second user ("John Doe"). In some instances, the image 406 and the identifier 410 can be presented, as shown. One or more options to modify at least one of the identifier 410 or information associated with the image 406 can also be provided. The one or more options can include an option 412 to remove the identifier 410. Moreover, an upload command to upload the image can be received, such as when the first user 404 clicks on, taps on, or otherwise interacts with the "Post" button. In some instances, the identifier for the second user, the name of the second user, a tag associated with the second user, and/or the one or more options, etc., can be presented before the first user 404 clicks on, taps on, or otherwise interacts with the "Post" button. In some cases, the image 406 and the identifier 410 can be transmitted subsequent to receiving the upload command.

Moreover, in some cases, a location of the face object 408 within the image 406 can be determined, such as during face detection. The identifier 410 can be presented based on the location of the face object 408 within the image 406. As shown in the example scenario 400, the identifier 410 can be presented to appear to overlay the image 406 and can be presented to avoid obscuring the face object 408 included in the image 406.

As discussed, the selection of the image 406 can be received from the first user 404 (i.e., an uploading user). The uploading user 404 can be associated with a set of social connections via the social networking system. For instance, the uploading user 404 can have a list of friends via the social networking system. In some embodiments, facial recognition processes applied to provided image portions can utilize, at least in part, one or more face models or face templates associated with a subset of social connections out of the set of social connections. In some implementations, the subset of social connections can include a specified quantity of highest ranked social connections (e.g., the top 50 friends closest to the uploading user 404, the top 100 friends who have recently interacted with the uploading user 404, the top 220 friends who have the most social interactions with the uploading user 404, etc.). Each social connection in the set can be ranked based on at least one of a social coefficient metric for each social connection relative to the uploading user, a social affinity metric for each social connection relative to the uploading user, a social interaction recency metric for each social connection relative to the uploading user, or location data associated with each social connection. It should be appreciated that many variations are possible.

Figure 5:
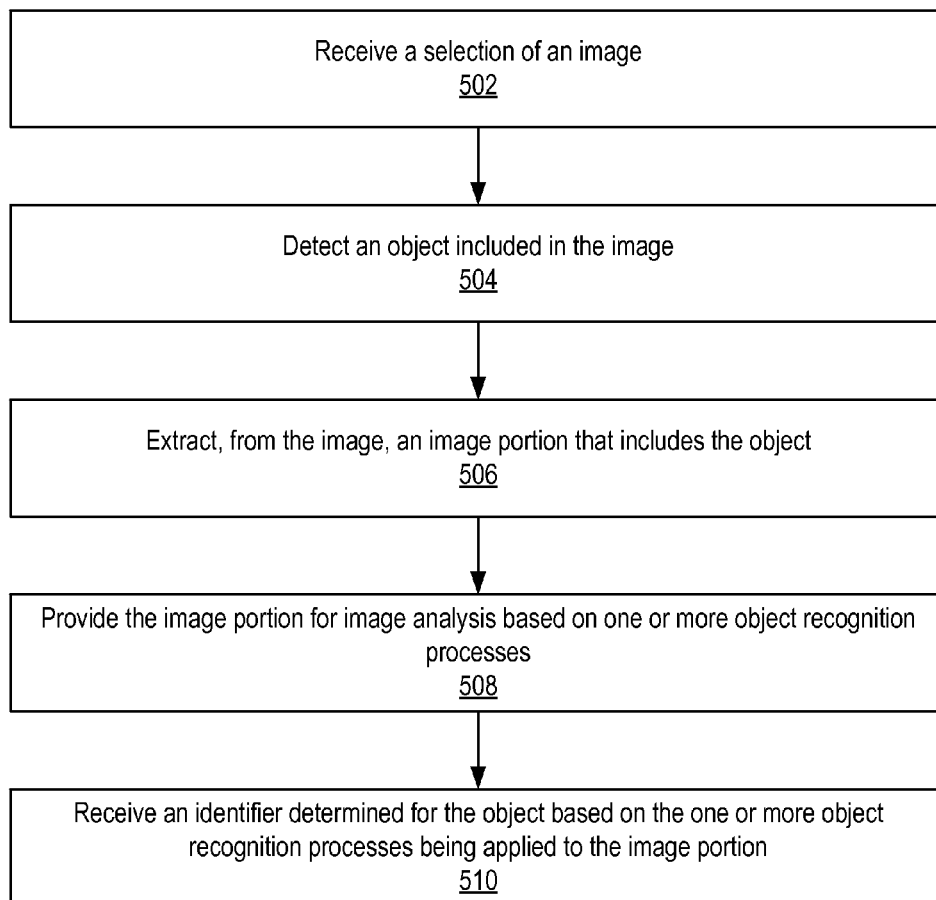
FIG. 5 illustrates an example method associated with providing object recognition based on detecting and extracting media portions, according to an embodiment of the present disclosure.

FIG. 5 illustrates an example method 500 associated with providing object recognition based on detecting and extracting media portions, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can receive a selection of an image. At block 504, the example method 500 can detect an object included in the image. At block 506, the example method 500 can extract, from the image, an image portion that includes the object. At block 508, the example method 500 can provide the image portion for image analysis based on one or more object recognition processes. At block 510, the example method 500 can receive an identifier for the object. The identifier can be determined based on the one or more object recognition processes being applied to the image portion.

Figure 6:
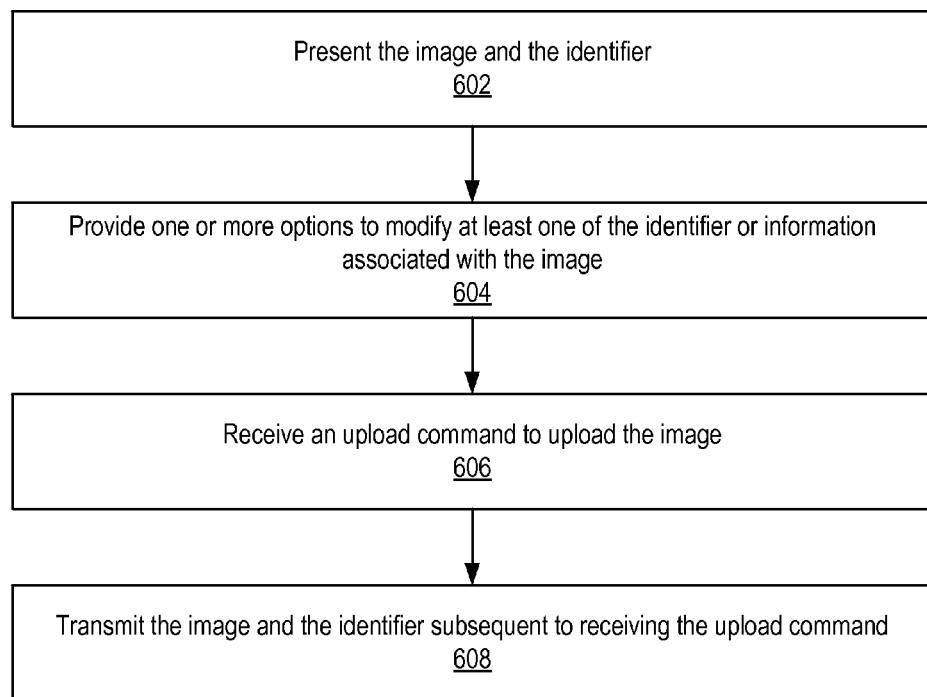
FIG. 6 illustrates an example method associated with providing object recognition based on detecting and extracting media portions, according to an embodiment of the present disclosure.

FIG. 6 illustrates an example method 600 associated with providing object recognition based on detecting and extracting media portions, according to an embodiment of the present disclosure. Again, it should be appreciated that there can be additional, fewer, or alternative steps performed in similar or alternative orders, or in parallel, within the scope of the various embodiments unless otherwise stated.

At block 602, the example method 600 can present the image and the identifier. At block 604, the example method 600 can provide one or more options to modify at least one of the identifier or information associated with the image. At block 606, the example method 600 can receive an upload command to upload the image. At block 608, the example method 600 can transmit the image and the identifier subsequent to receiving the upload command.

In some embodiments, the one or more facial recognition processes can utilize, at least in part, one or more people clustering processes. In some embodiments, the identifier can be utilized, at least in part, to define a set of images such that each image in the set includes a respective object associated with the identifier. The set of images can, for instance, form an album, which can be shared or synchronized among one or more users.

It is contemplated that there can be many other uses, applications, features, possibilities, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
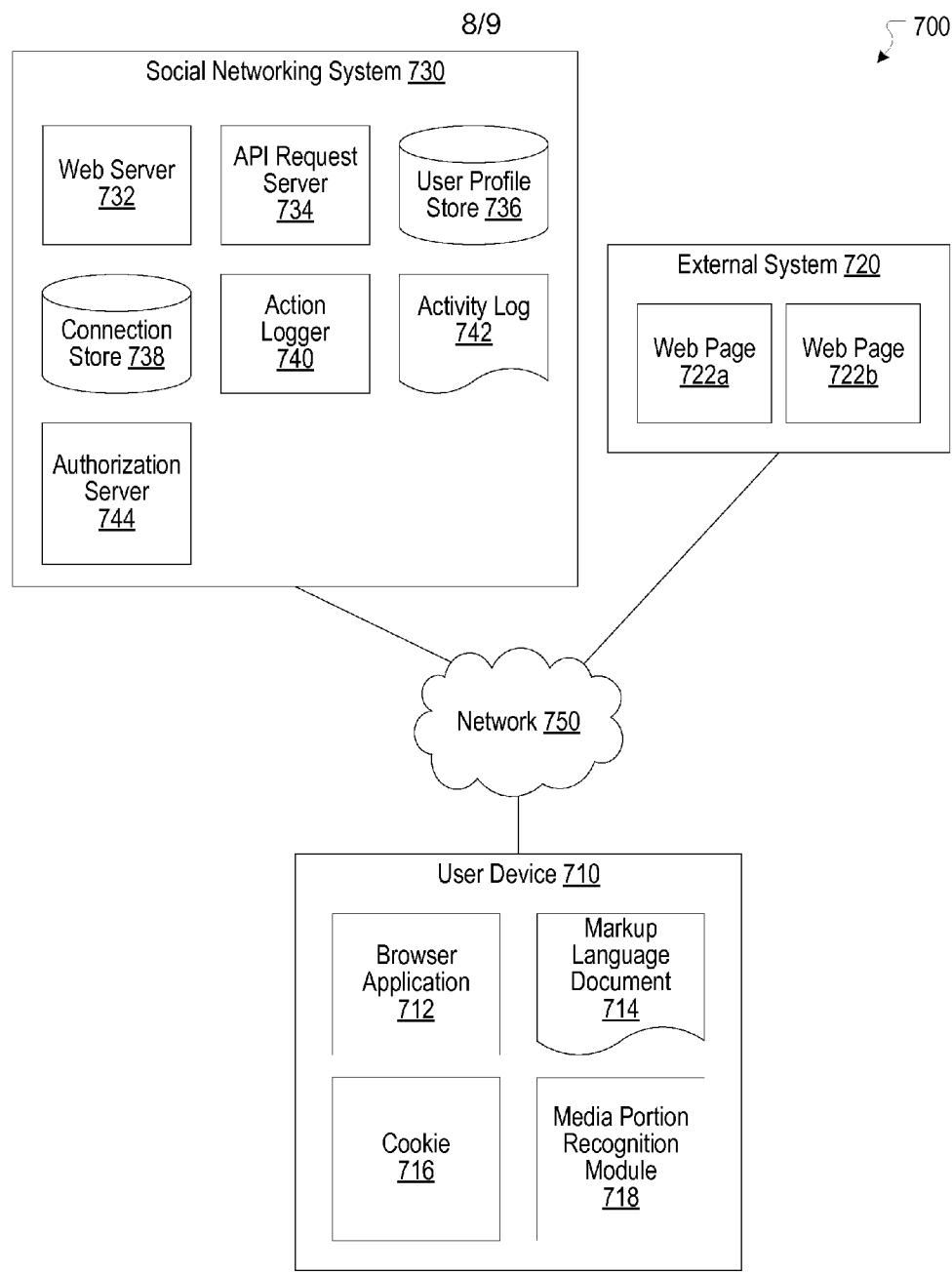
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the user device 710 can include a media portion recognition module 718. The media portion recognition module 718 can, for example, be implemented as the media portion recognition module 102 of FIG. 1. As discussed previously, it should be appreciated that there can be many variations or other possibilities. For example, in some instances, the media portion recognition module 718 (or at least a portion thereof) can be included in the social networking system 730. Other features of the media portion recognition module 718 are discussed herein in connection with the media portion recognition module 102.

Hardware Implementation

Figure 8:
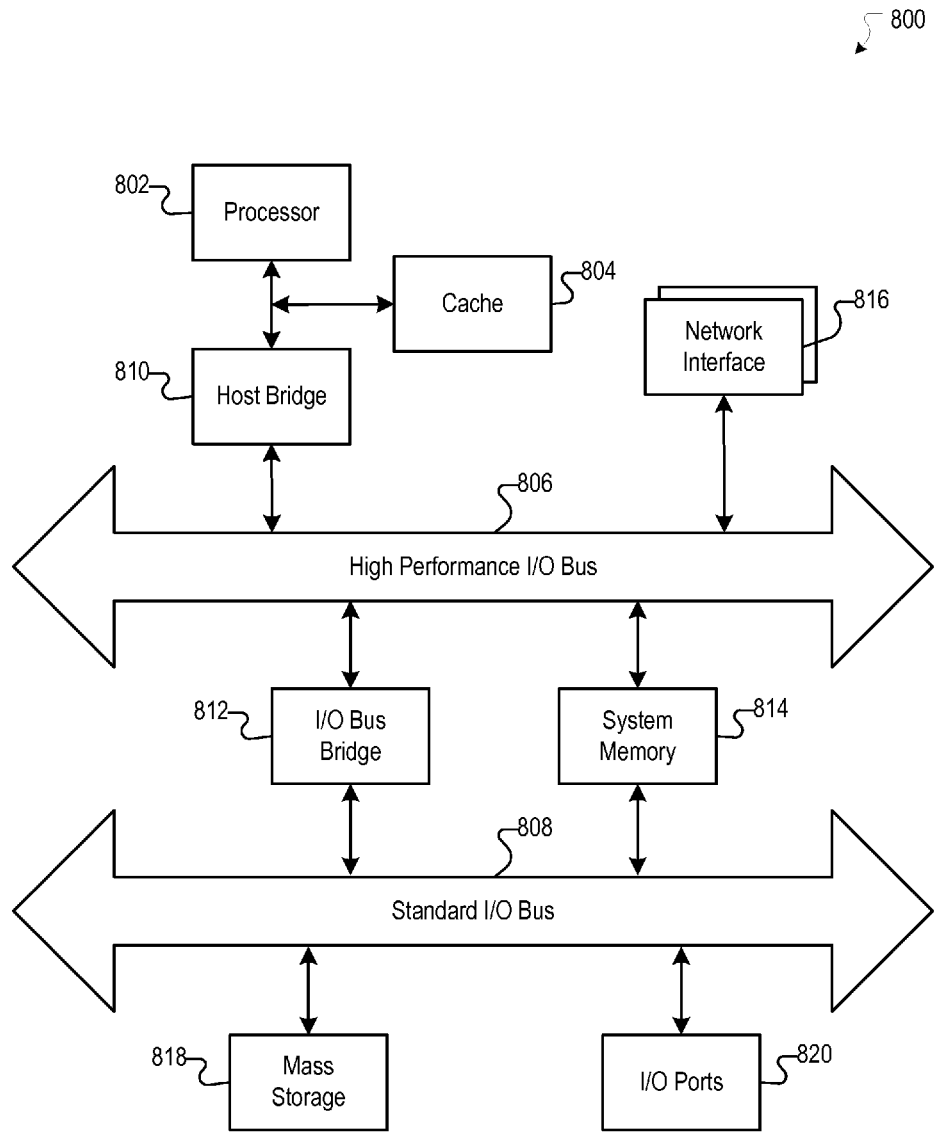
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system, a selection of an image by an uploading user;
   detecting, by the computing system, an object included in the image;
   extracting, by the computing system, from the image, an image portion comprising a set of pixels that includes the object;
   providing, by the computing system, to one or more servers remote from the computing system the image portion for image analysis based on one or more object recognition processes performed, at least in part, via the one or more servers remote from the computing system;
   receiving, by the computing system, an identifier for the object, the identifier being determined based on the one or more object recognition processes being applied to the image portion;
   presenting, by the computing system, the image and the identifier to the uploading user; and
   transmitting, by the computing system, the image and the identifier to a networking system in response to an upload command by the uploading user.

2. The computer-implemented method of claim 1, further comprising:
   providing the uploading user one or more options to modify the identifier.

3. The computer-implemented method of claim 1, wherein detecting the object included in the image further comprises determining a location of the object within the image, wherein the identifier is presented based on the location of the object within the image, wherein the identifier is presented to appear to overlay the image, and wherein the identifier is presented to avoid obscuring the object included in the image.

4. The computer-implemented method of claim 1, further comprising:
   detecting a second object included in the image;
   extracting, from the image, a second image portion that includes the second object; and
   providing the second image portion for image analysis based on the one or more object recognition processes, wherein the image portion and the second image portion are provided in conjunction.

5. The computer-implemented method of claim 1, wherein the object includes a face of a user represented in the image, wherein the one or more object recognition processes include one or more facial recognition processes, and wherein the identifier includes a name associated with the user.

6. The computer-implemented method of claim 5, wherein the one or more facial recognition processes utilizes, at least in part, one or more people clustering processes.

7. The computer-implemented method of claim 5, wherein the uploading user is associated with a set of social connections via the networking system, and wherein the one or more facial recognition processes utilizes, at least in part, one or more face models associated with a subset of social connections out of the set of social connections.

8. The computer-implemented method of claim 7, wherein the subset of social connections includes a specified quantity of highest ranked social connections, and wherein each social connection in the set is ranked based on at least one of a social coefficient metric for each social connection relative to the uploading user, a social affinity metric for each social connection relative to the uploading user, a social interaction recency metric for each social connection relative to the uploading user, or location data associated with each social connection.

9. The computer-implemented method of claim 1, wherein the identifier is utilized, at least in part, to define a set of images such that each image in the set includes a respective object associated with the identifier.

10. A system comprising:
at least one processor; and
a memory storing instructions that, when executed by the at least one processor, cause the system to perform:
receiving a selection of an image by an uploading user;
detecting an object included in the image;
extracting, from the image, an image portion comprising a set of pixels that includes the object;
providing to one or more servers remote from the computing system the image portion for image analysis based on one or more object recognition processes performed, at least in part, via the one or more servers remote from the computing system;
receiving an identifier for the object, the identifier being determined based on the one or more object recognition processes being applied to the image portion;
presenting the image and the identifier to the uploading user; and
transmitting the image and the identifier to a networking system in response to an upload command by the uploading user.

11. The system of claim 10, wherein the instructions cause the system to further perform:
providing the uploading user one or more options to modify the identifier.

12. The system of claim 10, wherein the one or more object recognition processes are performed, at least in part, via one or more remote servers.

13. The system of claim 10, wherein the object includes a face of a user represented in the image, wherein the one or more object recognition processes include one or more facial recognition processes, and wherein the identifier includes a name associated with the user.

14. The system of claim 13, wherein the uploading user is associated with a set of social connections via the networking system, and wherein the one or more facial recognition processes utilizes, at least in part, one or more face models associated with a subset of social connections out of the set of social connections.

15. A non-transitory computer-readable storage medium including instructions that, when executed by at least one processor of a computing system, cause the computing system to perform:
receiving a selection of an image by an uploading user;
detecting an object included in the image;
extracting, from the image, an image portion comprising a set of pixels that includes the object;
providing to one or more servers remote from the computing system the image portion for image analysis based on one or more object recognition processes performed, at least in part, via the one or more servers remote from the computing system;
receiving an identifier for the object, the identifier being determined based on the one or more object recognition processes being applied to the image portion;
presenting the image and the identifier to the uploading user; and
transmitting the image and the identifier to a networking system in response to an upload command by the uploading user.

16. The non-transitory computer-readable storage medium of claim 15, wherein the instructions cause the system to further perform:
providing the uploading user one or more options to modify the identifier.

17. The non-transitory computer-readable storage medium of claim 15, wherein the one or more object recognition processes are performed, at least in part, via one or more remote servers.

18. The non-transitory computer-readable storage medium of claim 15, wherein the object includes a face of a user represented in the image, wherein the one or more object recognition processes include one or more facial recognition processes, and wherein the identifier includes a name associated with the user.

19. The non-transitory computer-readable storage medium of claim 18, wherein the uploading user is associated with a set of social connections via the networking system, and wherein the one or more facial recognition processes utilizes, at least in part, one or more face models associated with a subset of social connections out of the set of social connections.

* * * * *